(12) United States Patent
Lim et al.

(10) Patent No.: US 7,483,962 B2
(45) Date of Patent: Jan. 27, 2009

(54) APPARATUS AND METHOD FOR AUTOMATICALLY ALLOCATING VIRTUAL ADDRESSES TO NODES HAVING SAME ADDRESS

(75) Inventors: Yong-jun Lim, Seoul (KR); Hyun-seok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1038 days.

(21) Appl. No.: 10/455,476

(22) Filed: Jun. 6, 2003

(65) Prior Publication Data

US 2004/0030769 A1   Feb. 12, 2004

(30) Foreign Application Priority Data

Jul. 5, 2002   (KR) ................. 10-2002-0038877

(51) Int. Cl.
*G06F 15/177* (2006.01)
(52) U.S. Cl. ............. 709/220; 709/222; 709/223; 709/245
(58) Field of Classification Search ......... 709/220–223, 709/245
See application file for complete search history.

(56) References Cited

U.S. PATENT DOCUMENTS 5,708,654 A * 1/1998 Arndt et al. ............. 370/242
6,925,079 B2 * 8/2005 Matsukawa ............. 370/389
6,947,401 B2 * 9/2005 El-Malki et al. ......... 370/331
6,959,009 B2 * 10/2005 Asokan et al. ............. 709/219
2002/0126642 A1 * 9/2002 Shitama .................. 370/338
2002/0165982 A1 * 11/2002 Leichter et al. ........... 709/245
2003/0009547 A1 * 1/2003 Benfield et al. ........... 709/223
2003/0037165 A1 * 2/2003 Shinomiya ............... 709/238

FOREIGN PATENT DOCUMENTS

| JP | 2000-253020 A | 9/2000 |
| JP | 2001-274845 | 5/2001 |
| JP | 2002-152248 A | 5/2002 |
| WO | WO 01/99354 A1 | 12/2001 |

* cited by examiner

*Primary Examiner*—Philip B Tran
(74) *Attorney, Agent, or Firm*—Sughrue Mion, PLLC

(57) ABSTRACT

There are provided an apparatus and method for automatically configuring virtual addresses for a duplicate address when the duplicate address is detected in a single subnet. The apparatus in a non-configured node includes a duplicate address search message transmitter, a duplicate address response message receiver, a virtual address allocation message transmitter, and a virtual address response message receiver. The apparatus in a configured node includes a duplicate address search message receiver, a duplicate address response message transmitter, and a virtual address response message receiver. The apparatus in a router includes a virtual address allocation message receiver, a virtual address allocator, and a virtual address response message transmitter.

24 Claims, 10 Drawing Sheets

(12) United States Patent
US 7,483,962 B2

APPARATUS AND METHOD FOR AUTOMATICALLY ALLOCATING VIRTUAL ADDRESSES TO NODES HAVING SAME ADDRESS

CROSS-REFERENCE TO RELATED APPLICATIONS

This application claims the priority of Korean Patent Application No. 2002-38877, filed on Jul. 5, 2002, which is incorporated herein in its entirety by reference.

BACKGROUND OF THE INVENTION

1. Field of the Invention

The present invention relates to an apparatus and method for automatically configuring virtual addresses for a duplicate address when the duplicate address is detected in a single subnet.

2. Description of the Related Art

Conventionally, when a new node enters a subnet, the new node sends a neighbor solicitation (NS) message to check whether there is a node having the same link local address as the new node in the subnet. If there is a node having the same link local address as the new node, the node informs the new node that there is a duplicate address by sending a neighbor advertisement (NA) message to the new node. If a duplicate address does not exist in the subnet, the new node sends a router solicitation (RS) message to a router and acquires prefix information of the subnet and router-related information through a router advertisement (RA) message. Through the above-described method, the address of the new node is automatically configured. When the new node generates a tentative address and transmits the tentative address by embedding it into an Internet Control Message Protocol (ICMP) field of the NS message, if the format of the tentative address is not an EUI-64 format, i.e., a standard for identifying a network interface address, but a format arbitrarily defined by a user, the likelihood of the occurrence of a duplicate address increases. Conventionally, duplicate address detection is first performed. If a duplicate address is detected, this fact is reported to a network manager, the network manger performs manual configuration, and a new node must wait until a new address is configured.

In addition, with an increase in the number of network terminals, the mobility of network terminals is enhanced, so the likelihood of duplication of interface identifications (IDs), i.e., the lower 64 bits of an Internet Protocol version 6 (IPv6) address, in the same subnet also increases. In other words, when media access control (MAC) addresses complying with various techniques use the network-layer IPv6 protocol, if an IPv6 address is duplicated, an address must be manually configured as described above. Consequently, address auto-configuration, which is a representative feature of the IPv6 address system, becomes useless.

SUMMARY OF THE INVENTION

The present invention provides an apparatus and method for generating a new virtual interface identification (ID) in order to automatically configure a virtual address for a duplicate address.

According to an aspect of the present invention, there is provided an apparatus for automatically allocating virtual addresses to nodes having the same address in a non-configured node. The apparatus includes a duplicate address search message transmitter, a duplicate address response message receiver, a virtual address allocation message transmitter, and a virtual address response message receiver.

According to another aspect of the present invention, there is provided an apparatus for automatically allocating virtual addresses to nodes having the same address in a configured node. The apparatus includes a duplicate address search message receiver, a duplicate address response message transmitter, and a virtual address response message receiver.

According to still another aspect of the present invention, there is provided an apparatus for automatically allocating virtual addresses to nodes having the same address in a router. The apparatus includes a virtual address allocation message receiver, a virtual address allocator, and a virtual address response message transmitter.

According to still another aspect of the present invention, there is provided an apparatus for automatically allocating virtual addresses to nodes having the same address. The apparatus includes an apparatus for automatically allocating virtual addresses to nodes having the same address in a non-configured node, an apparatus for automatically allocating virtual addresses to nodes having the same address in a configured node, and an apparatus for automatically allocating virtual addresses to nodes having the same address in a router.

BRIEF DESCRIPTION OF THE DRAWINGS

The above aspects and advantages of the present invention will become more apparent by describing in detail preferred embodiments thereof with reference to the attached drawings in which.

DETAILED DESCRIPTION OF THE INVENTION

Figure 1:
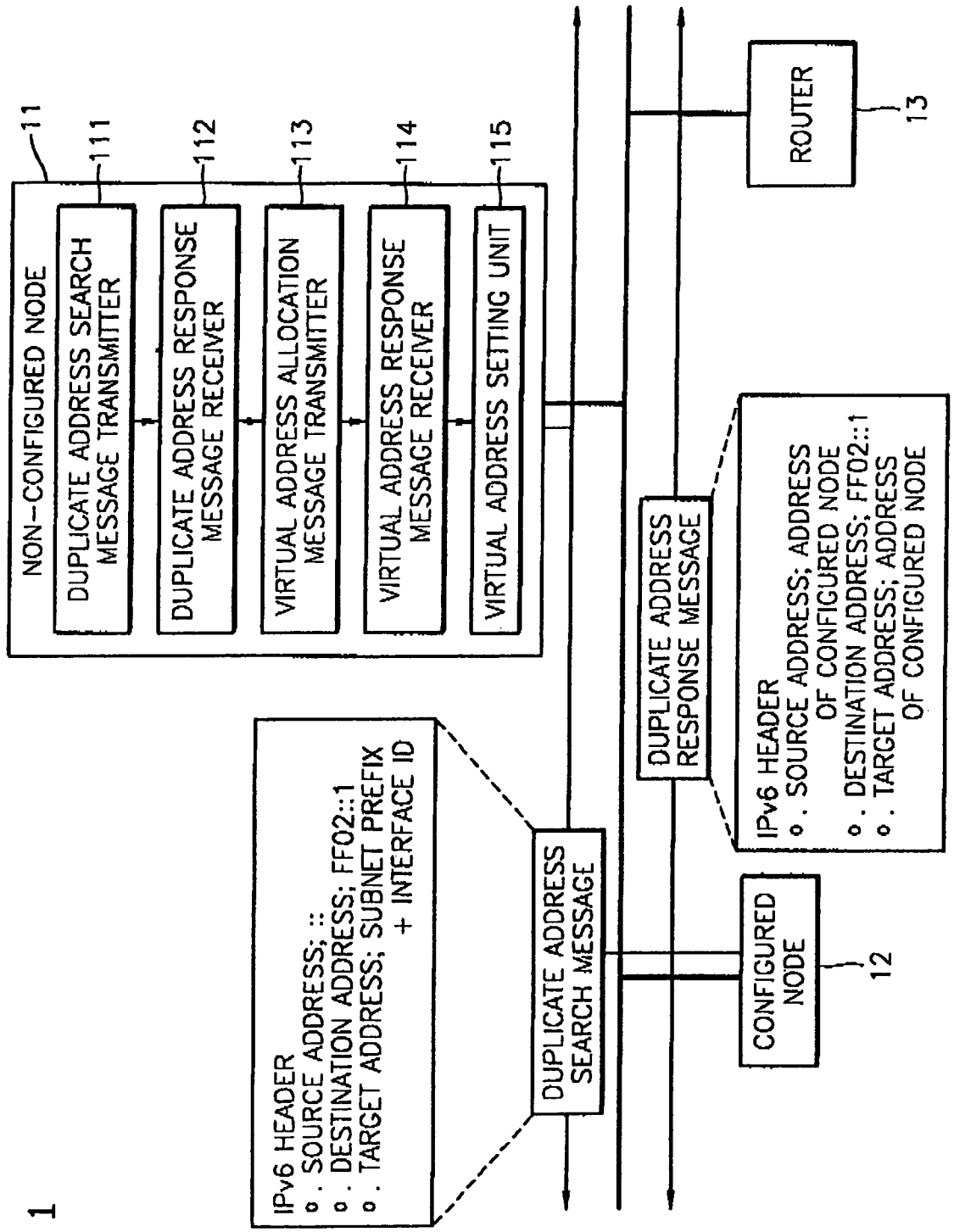
FIG. 1 is a diagram of an apparatus for automatically allocating virtual addresses to nodes having the same address in a non-configured node, according to an embodiment of the present invention, and shows only a duplicate address search message and a duplicate address response message as messages between the nodes.

Hereinafter, preferred embodiments of the present invention will be described in detail with reference to the attached drawings. In the drawings, the same reference numerals denote the same members.

Figure 2:
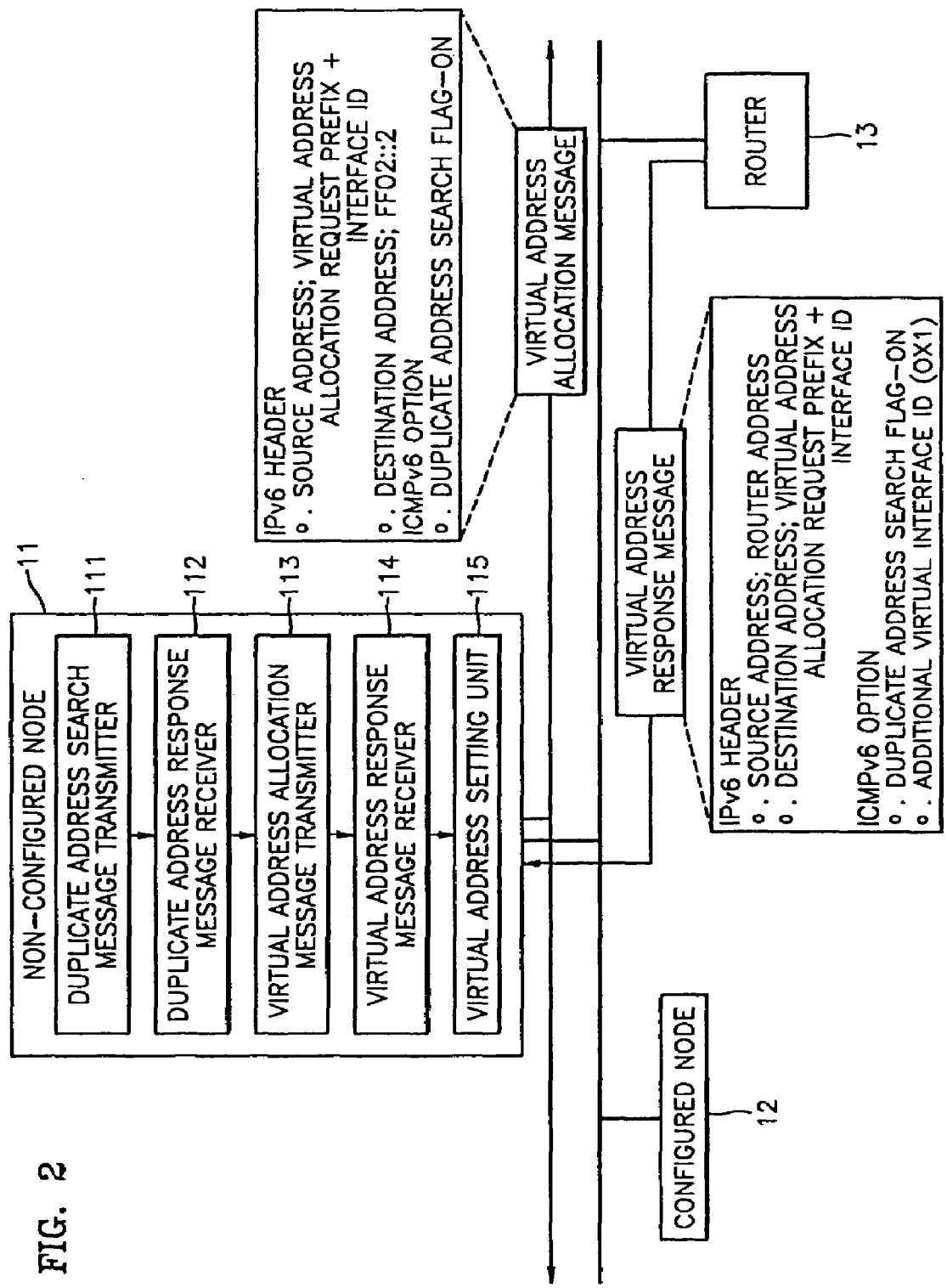
FIG. 2 is a diagram of the apparatus shown in FIG. 1 and shows only a virtual address allocation message and a virtual address response message as messages between the nodes.

FIG. 1 is a diagram of an apparatus for automatically allocating virtual addresses to nodes having the same address in a non-configured node, according to an embodiment of the present invention. Only a duplicate address search message and a duplicate address response message are shown as messages transmitted between the nodes. FIG. 2 is a diagram of the apparatus shown in FIG. 1 and shows only a virtual address allocation message and a virtual address response message as messages transmitted between the nodes.

Referring to FIGS. 1 and 2, an apparatus for automatically allocating virtual addresses to nodes having the same address in a non-configured node 11 includes a duplicate address search message transmitter 111, a duplicate address response message receiver 112, a virtual address allocation message transmitter 113, a virtual address response message receiver 114, and a virtual address setting unit 115.

An address indicates an Internet Protocol (IP) address in an Internet Protocol version 6 (IPv6) environment. A duplicate address indicates an address of a configured node 12, which receives the duplicate address search message, or an address of the non-configured node 11 when the address of the non-configured node 11 is the same as that of the configured node 12. A virtual address indicates an address in which a virtual interface identification (ID) is added to the duplicate address.

The duplicate address search message transmitter 111 generates and transmits a duplicate address search message to an arbitrary node included in a subnet including the non-configured node 11. The duplicate address search message contains a source address set to a non-configured address, a destination address set to the multicast address for all nodes included in the subnet, and a target address set to a tentative address of the non-configured node 11. An IPv6 node detects whether a duplicate address is used in a local link using a neighbor discovery (ND) message. The duplicate address search message is a kind of ND message. In the duplicate address search message, a source address field of the IPv6 header is set to a non-configured address "::" because the source address for which duplicate address detection is performed cannot be used until it is determined that a duplicate address does not exist. A destination address field of the duplicate address search message is set to a multicast address, which is for all nodes included in the subnet, i.e., a link-entire local range-node multicast address "FF02::1", in order to send the duplicate address search message to all of the nodes in the subnet because it is unknown as to which node uses the duplicate address. A target address field of the duplicate address search message is set to an IPv6 address for which duplication is to be detected. The IPv6 address is made by combining the subnet prefix and the interface ID of the non-configured node 11.

The duplicate address response message receiver 112 receives a message responding to the duplicate address search message from the configured node 12 having received the duplicate address search message. The message responding to the duplicate address search message is referred to as a duplicate address response message. The duplicate address response message contains the address of the configured node 12 as a source address, the multicast address for all nodes included in the subnet as a destination address, and the address of the configured node 12 as a target address. In the duplicate address response message, the destination address of an IP header is set to a multicast address, which is for all nodes included in the subnet, i.e., a link-entire local range-node multicast address "FF02::1" because the node sending the duplicate address search message cannot receive a unicast ND message since the node does not use a uniquely allocated IP address.

When the duplicate address response message indicates that there is a duplicate address, the virtual address allocation message transmitter 113 generates and transmits a virtual address allocation message to the router 13 included in the subnet. The non-configured node 11 sets an interface so as not to use the duplicate IP address. When the duplicate address response message does not indicate that there is a duplicate address, the non-configured node 11 initializes an address in the interface. The virtual address allocation message contains a source address set to a tentative address including a virtual address allocation request prefix and the interface ID and a destination address set to a multicast address of all routers included in the subnet, and carries a duplicate address search flag set to be ON as additional information. In order to discriminate the source address from the existing duplicate address, the tentative address composed of the virtual address allocation request prefix and the interface ID is used as the source address. The virtual address allocation request prefix is a prefix of a router solicitation (RS) message, i.e., a newly defined ND message in the present invention, and can be defined as, for example, FE80::2. Accordingly, the source address of the IPv6 header is FE80::2+64-bit interface ID. The destination address must be the address of a router, which can generate a virtual address. Since the router is not specified, the virtual address allocation message must be transmitted through multicast. Accordingly, the multicast address of all routers 13 included in the subnet, i.e., the link-entire local range-router multicast address FF02::2, is used as the destination address. Upon receiving the virtual address allocation message, all of the routers 13 on the local link send a message (referred to as a virtual address response message) responding to the virtual address allocation message to the non-configured node 11, which sent the virtual address allocation message, through unicast. The virtual address response message contains a source address set to the address of the router 13 receiving the virtual address allocation message and a destination address set to a tentative address composed of the virtual address allocation request prefix and the interface ID, carries a duplicate address search flag set to be ON as additional information, and provides an additional virtual interface ID. In other words, the destination address of the virtual address response message is the address of the non-configured node 11.

The virtual address response message receiver 114 receives the virtual address response message from the router 13.

When the non-configured node 11 receives the virtual address response message, the virtual address setting unit 115 sets the virtual address contained in the virtual address response message as the address of the non-configured node 11. In other words, the non-configured node 11 confirms that the duplicate address search flag is set to be ON and generates the virtual address using the additional virtual interface ID 0X1. The address of the non-configured node 11 has a format of subnet prefix+interface ID+additional virtual interface ID.

Figure 3:
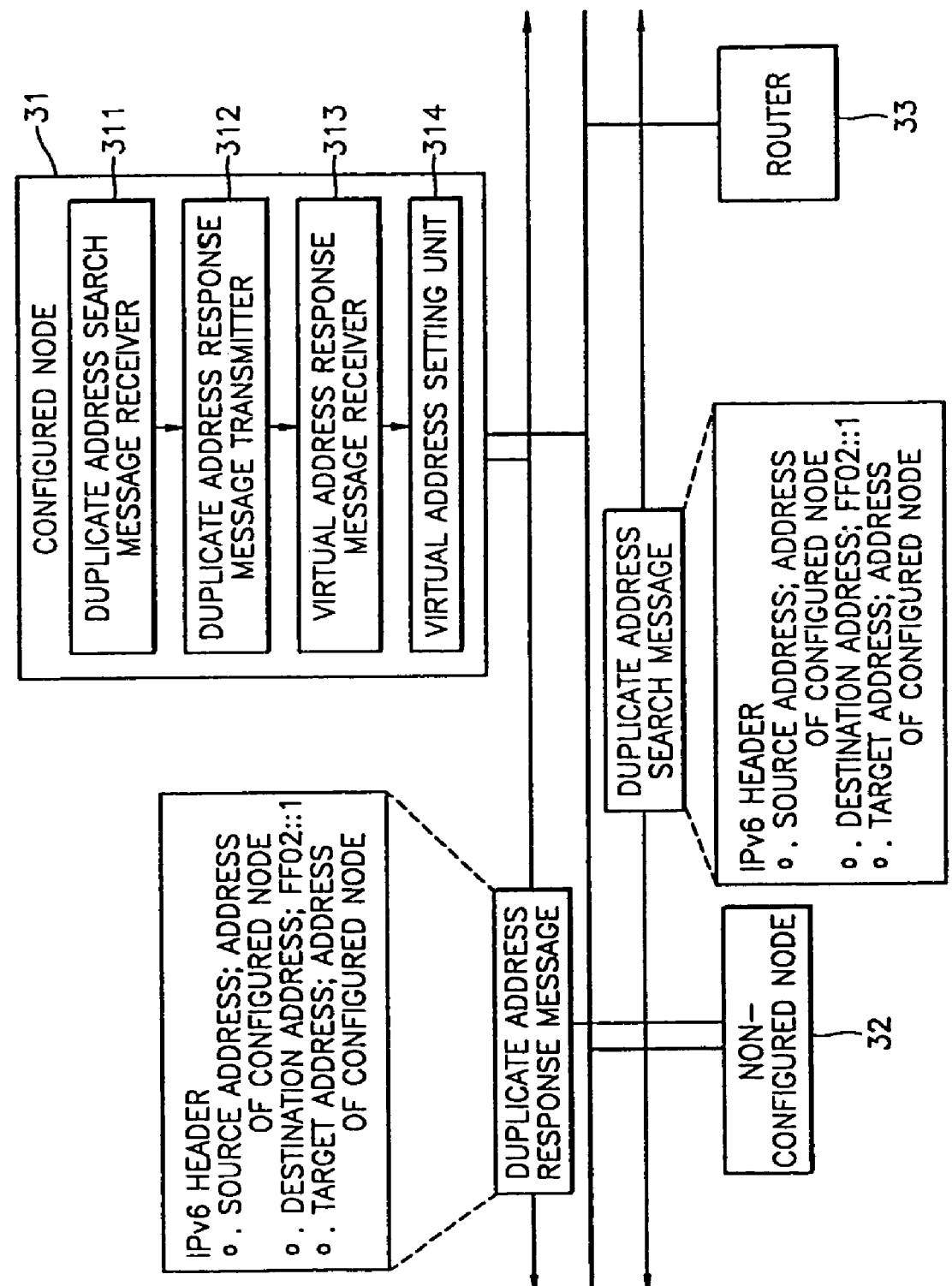
FIG. 3 is a diagram of an apparatus for automatically allocating virtual addresses to nodes having the same address in a configured node, according to another embodiment of the present invention, and shows only a duplicate address search message and a duplicate address response message as messages between the nodes.
Figure 4:
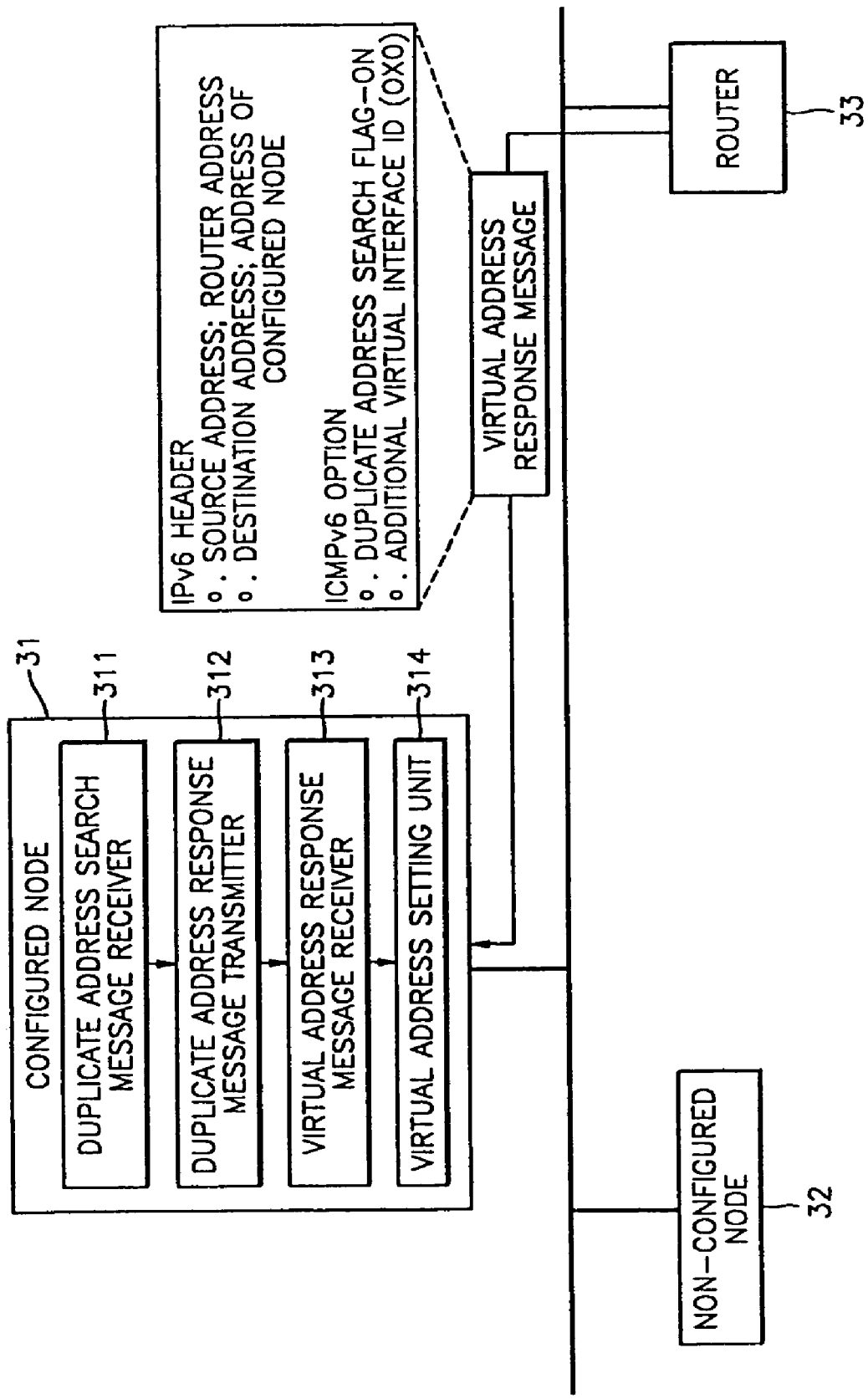
FIG. 4 is a diagram of the apparatus shown in FIG. 3 and shows only a virtual address response message as a message between the nodes.

FIG. 3 is a diagram of an apparatus for automatically allocating virtual addresses to nodes having the same address in a configured node, according to another embodiment of the present invention. Only a duplicate address search message and a duplicate address response message are shown as messages between nodes. FIG. 4 is a diagram of the apparatus shown in FIG. 3 and shows only a virtual address response message as a message between nodes.

An apparatus for automatically allocating virtual addresses to nodes having the same address in a configured node 31 includes a duplicate address search message receiver 311, a duplicate address response message receiver 312, a virtual address response message receiver 313, and a virtual address setting unit 314.

An address indicates an IP address in an IPv6 environment. A duplicate address indicates an address of a configured node 31 when an address contained in the duplicate address search message is the same as that of the configured node 31. A virtual address indicates an address in which a virtual interface ID is added to the duplicate address.

The duplicate address search message receiver 311 receives a duplicate address search message from a non-configured node 32 included in a subnet including the configured node 31. The duplicate address search message contains a source address set to a configured address, a destination address set to the multicast address for all nodes included in the subnet, and a target address set to a tentative address of the non-configured node 32 transmitting the duplicate address search message. Since it is unknown as to which node has a duplicate address, the destination address is set to the multicast address, which is for all nodes included in the subnet, i.e., a link-entire local range-node multicast address "FF02::1", so that the duplicate address search message is sent to all of the nodes included in the subnet. The target address is the address of a node inquiring about a duplication, i.e., an IPv6 address for which duplication is to be detected.

As soon as the duplicate address search message receiver 311 receives the duplicate address search message, the router 33 generates and sends a message (referred to as a duplicate address response message) responding to the duplicate address search message to the non-configured node 32 included in the subnet. In other words, the duplicate address response message transmitter 312 generates and sends the duplicate address response message to the non-configured node 32. The duplicate address response message contains the address of the configured node 31, which receives the duplicate address search message, as a source address; the multicast address for all nodes included in the subnet as a destination address; and the address of the configured node 31, which receives the duplicate address search message, as a target address. The destination address of the duplicate address response message is set to a link-entire local range-node multicast address "FF02::1", so the duplicate address response message is sent to all nodes included in the subnet. When the non-configured node 32 receives the duplicate address response message and determines that the source address of the duplicate address response message is the same as the tentative address of the non-configured node 32, a duplicate address is proven to exist.

The virtual address response message receiver 313 receives a message, i.e., a virtual address response message, responding to a virtual address allocation message responding to the duplicate address response message, from an arbitrary router included in the subnet. The arbitrary router included in the subnet is the router 33 receiving the virtual address allocation message. However, as an important difference between IPv4 router detection and IPv6 router detection, when a current fundamental router cannot be used, a new router is selected from a list of fundamental routers. Upon receiving the virtual address allocation message, the router 33 transmits the virtual address response message. The virtual address response message contains a source address set to the address of the router 33 and a destination address set to the address of the configured node 31, carries a duplicate address search flag set to be ON as additional information, and provides an additional virtual interface ID. When the configured node 31 receives the virtual address response message, the virtual address setting unit 314 sets a virtual address contained in the virtual address response message as the address of the configured address 31. In other words, the configured node 31 confirms that the duplicate address search flag is set to be ON and then generates the virtual address using the additional virtual interface ID "0X0". The address of the configured node 31 has a format of subnet prefix+interface ID+additional virtual interface ID.

Figure 5:
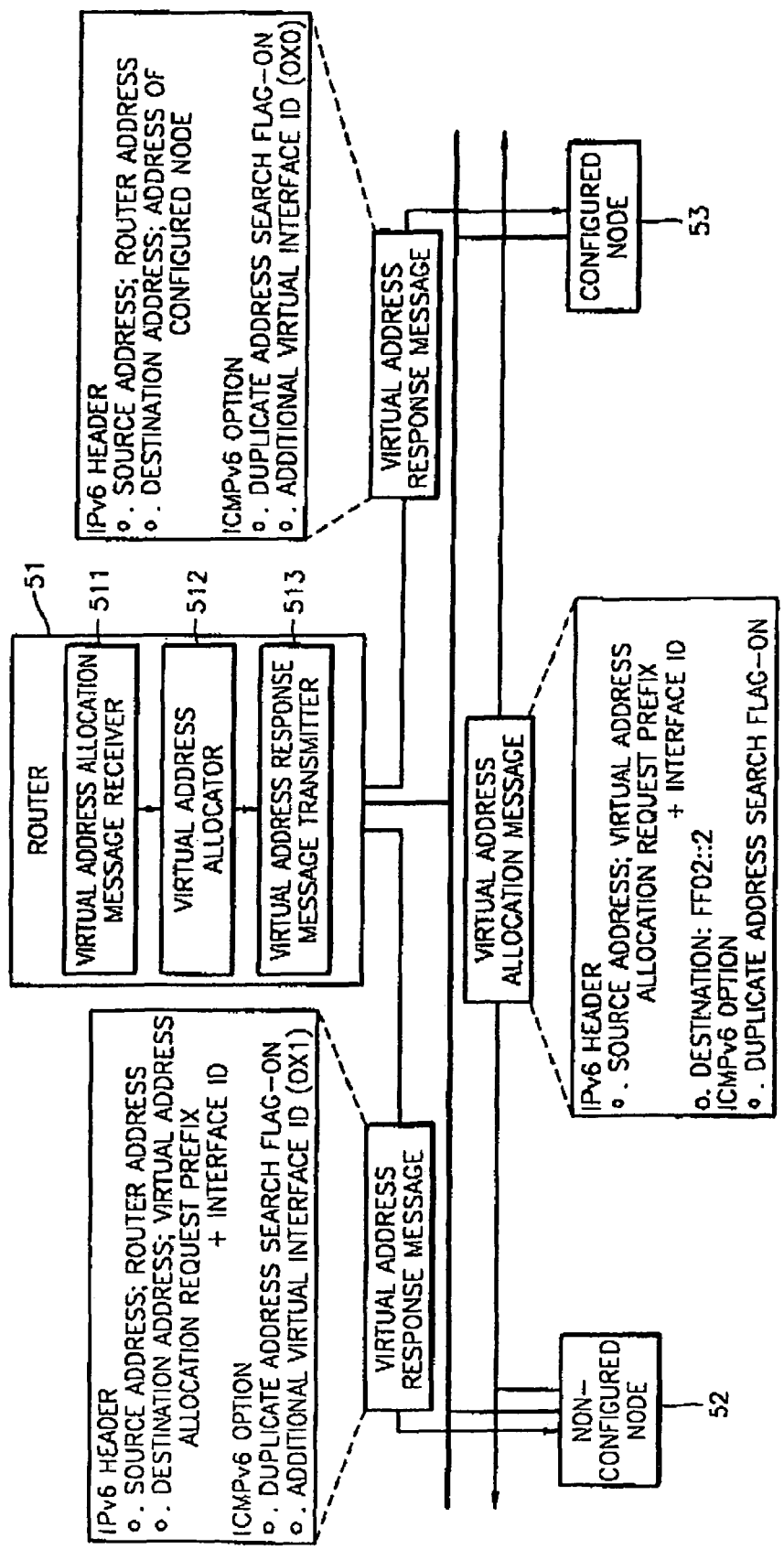
FIG. 5 is a diagram of an apparatus for automatically allocating virtual addresses to nodes having the same address in a router, according to still another embodiment of the present invention.

FIG. 5 is a diagram of an apparatus for automatically allocating virtual addresses to nodes having the same address in a router 51, according to still another embodiment of the present invention. In the router 51, the apparatus for automatically allocating virtual addresses to nodes having the same address includes a virtual address allocation message receiver 511, a virtual address allocator 512, and a virtual address response message transmitter 513.

An address indicates an IP address in an IPv6 environment. A duplicate address indicates an address of a configured node 53 or an address of an arbitrary node when the address of the arbitrary node included in a subnet including the configured node 53 is the same as that of the configured node 53. A virtual address indicates an address in which a virtual interface ID is added to the duplicate address.

The virtual address allocation message receiver 511 receives a virtual address allocation message from an arbitrary node included in the subnet including the router 51. The virtual address allocation message is an ND message having a new format defined according to the present invention to request the allocation of a virtual address. The virtual address allocation message is generated when a duplicate address response message responding to a duplicate address search message is received from the configured node 53 and the header of the duplicate address response message indicates that there is a duplicate address. The virtual address allocation message contains a source address set to a tentative address composed of a virtual address allocation request prefix and an interface ID and a destination address set to a multicast address for all routers included in the subnet, and carries a duplicate address search flag set to be ON as additional information. The source address is set to the tentative address in order to discriminate the source address from an existing duplicate address. The virtual address allocation request prefix is a prefix of an RS message, which is one of the ND messages defined in the present invention. For example, the virtual address allocation request prefix can be defined by a format of FE80::2. Accordingly, the source address of an IPv6 header can be FE80::2+64-bit interface ID. The destination address must be set to the address of a router that can generate the virtual address. Since the router is not specified, the virtual address allocation message must be transmitted through multicast. Accordingly, the destination address is set to the multicast address for all routers 51 included in the subnet, i.e., a link-entire local range-router multicast address "FF02::2". Upon receiving the virtual address allocation message, all routers 51 on the local link send a virtual address response message responding to the virtual address allocation message to a node sending the virtual address allocation message through unicast.

The virtual address allocator 512 allocates virtual addresses to nodes having the same address as a duplicate address included in the virtual address allocation message. In other words, appropriate additional virtual interface IDs (for example, 0X0 and 0X1) are set for duplicate addresses.

The virtual address response message transmitter 513 generates virtual address response messages respectively including the allocated virtual addresses and transmits them to nodes having the same addresses in the subnet. A first virtual address response message contains a source address set to the address of the router 51 and a destination address set to the address of the configured node 53, carries a duplicate address search flag set to be ON as additional information, and provides the additional virtual interface ID. The configured node 53 confirms that the duplicate address search flag is set to be ON and generates a virtual address using the additional virtual interface ID (for example, 0X0). The address of the configured node 53 has a format of subnet prefix+interface ID+additional virtual interface ID (0X0). A second virtual address response message contains a source address set to the address of the router 51 and a destination address set to a tentative address composed of a virtual address allocation request prefix and an interface ID, carries a duplicate address search flag set to be ON as additional information, and provides the additional virtual interface ID. In other words, the destination address is the address of the non-configured node 52. The non-configured node 52 confirms that the duplicate address search flag is set to be ON and generates a virtual address using the additional virtual interface ID (for example, 0X1). The address of the non-configured node 52 has a format of subnet prefix+interface ID+additional virtual interface ID (0X1).

Figure 6:
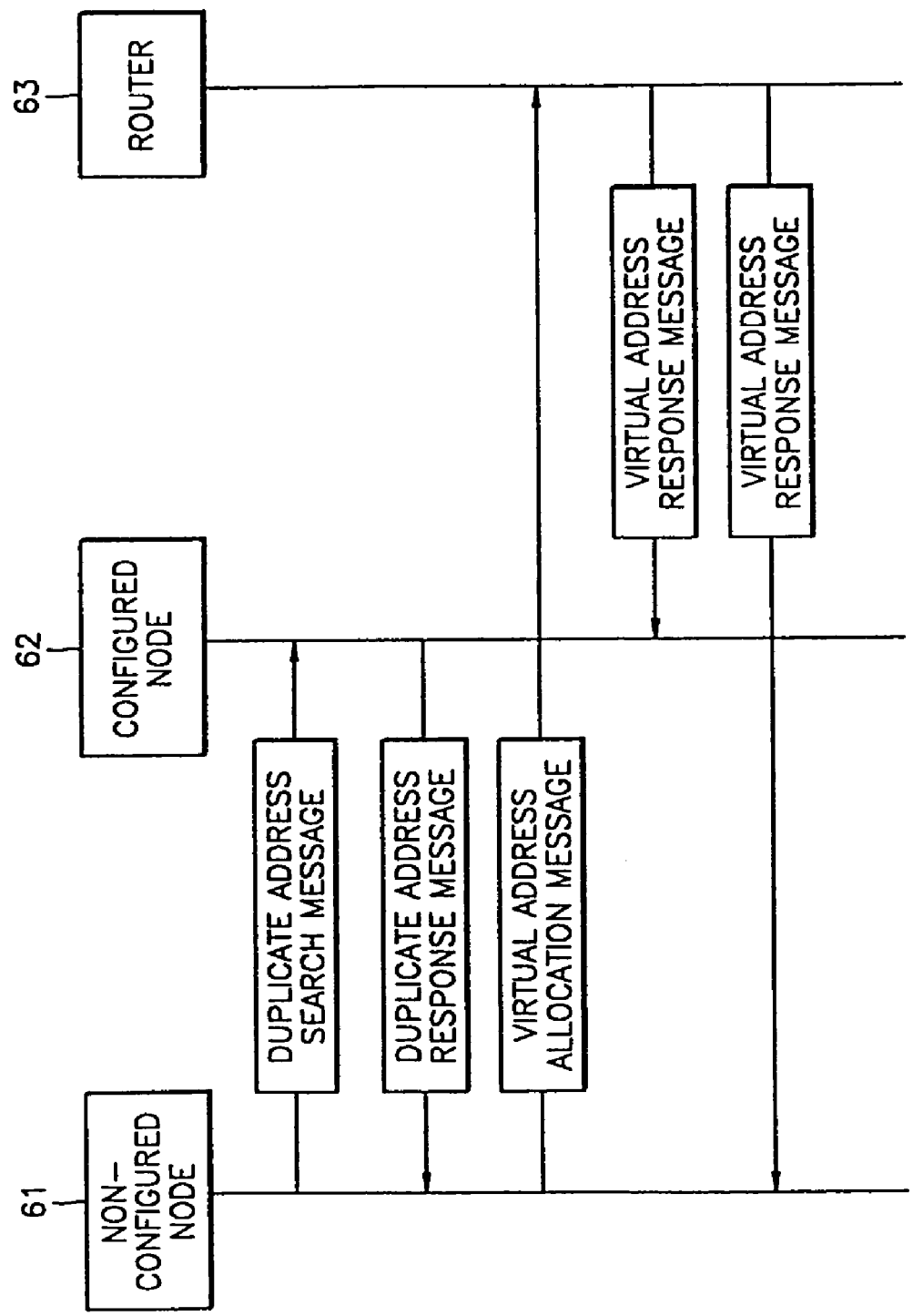
FIG. 6 is a diagram of an apparatus for automatically allocating virtual addresses to nodes having the same address, according to still another embodiment of the present invention.

FIG. 6 is a diagram of an apparatus for automatically allocating virtual addresses to nodes having the same address, according to still another embodiment of the present invention. The apparatus for automatically allocating virtual addresses to nodes having the same address includes an apparatus for automatically allocating virtual addresses to nodes having the same address in a non-configured node 61, an apparatus for automatically allocating virtual addresses to nodes having the same address in a configured node 62, and an apparatus for automatically allocating virtual addresses to nodes having the same address in a router 63.

An address indicates an IP address in an IPv6 environment. A duplicate address indicates an address of the configured node 62 or an address of the non-configured node 61 when the address of the non-configured node 61 is the same as that of the configured node 62 receiving a duplicate address search message. A virtual address indicates an address in which a virtual interface ID is added to the duplicate address.

In the non-configured node 61, the apparatus for automatically allocating virtual addresses to nodes having the same address generates and transmits a duplicate address search message to the arbitrary configured node 62 included in the subnet including the non-configured node 61 and receives a duplicate address response message. When the duplicate address response message indicates that there is a duplicate address, the apparatus in the non-configured node 61 generates and transmits a virtual address allocation message to the arbitrary router 63 included in the subnet, receives a virtual address response message, and sets a virtual address included in the virtual address response message as the address of the non-configured node 61.

In the configured node 62, the apparatus for automatically allocating virtual addresses to nodes having the same address receives the duplicate address search message from the non-configured node 61 included in the subnet, determines whether the duplicate address included in the duplicate address search message is the same as the address of the configured node 62, and generates and transmits the duplicate address response message including the determined result to the non-configured node 61.

In the router 63, the apparatus for automatically allocating virtual addresses to nodes having the same address receives the virtual address allocation message from the non-configured node 61 included in the subnet, allocates the virtual addresses to the non-configured node 61 and the configured node 62, which have the duplicate address included in the virtual address allocation message, and generates the virtual address response messages including the virtual addresses, respectively.

The duplicate address search message contains a source address set to a non-configured address, a destination address set to a multicast address for all nodes included in the subnet, and a target address set to a tentative address of the non-configured node 61. The duplicate address response message contains a source address set to the address of the configured node 62 receiving the duplicate address search message, a destination address set to the multicast address for all nodes included in the subnet, and a target address set to the address of the configured node 62 receiving the duplicate address search message. The virtual address allocation message contains a source address set to a tentative address composed of a virtual address allocation request prefix and an interface ID and a destination address set to a multicast address for all routers included in the subnet, and carries a duplicate address search flag set to be ON as additional information. A first virtual address response message contains a source address set to the address of the router 63 receiving the virtual address allocation message and a destination address set to the address of the configured node 62, carries a duplicate address search flag set to be ON as additional information, and provides an additional virtual interface ID. A second virtual address response message contains a source address set to the address of the router 63 receiving the virtual address allocation message and a destination address set to the tentative address composed of the virtual address allocation request prefix and the interface ID, carries a duplicate address search flag set to be ON as additional information, and provides an additional virtual interface ID.

Figure 7:
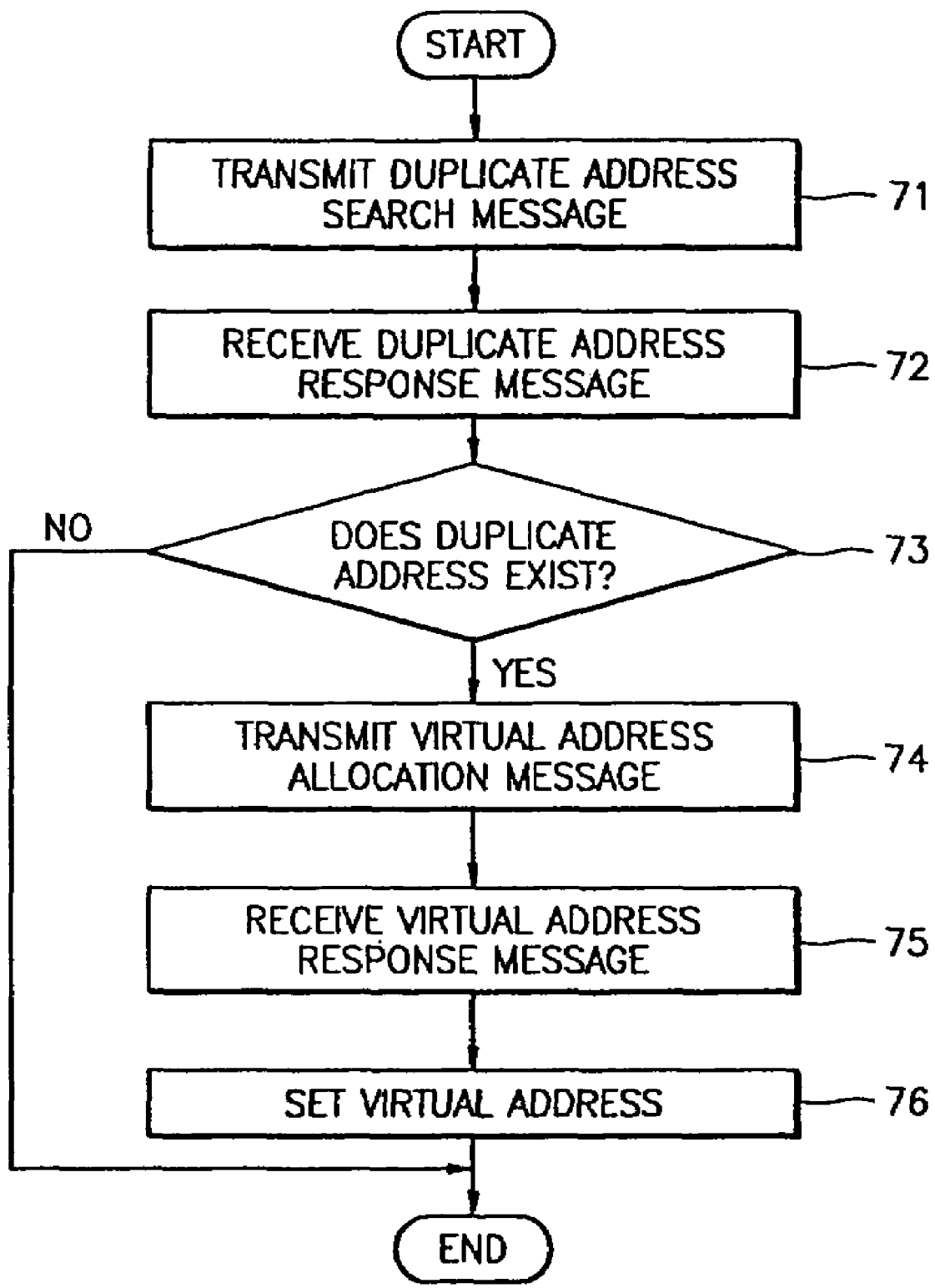
FIG. 7 is a flowchart of a method of a non-configured node automatically allocating virtual addresses to nodes having the same address, according to an embodiment of the present invention.

FIG. 7 is a flowchart of a method of a non-configured node automatically allocating virtual addresses to nodes having the same address, according to an embodiment of the present invention. A duplicate address search message is generated and transmitted to an arbitrary node included in a subnet including the non-configured node in step 71. Next, a duplicate address response message is received from the arbitrary node receiving the duplicate address search message in step 72. Next, if the duplicate address response message indicates that there is a duplicate address in step 73, a virtual address allocation message is generated and transmitted to an arbitrary router included in the subnet in step 74. Next, a virtual address response message is received from the arbitrary router receiving the virtual address allocation message in step 75. Then, a virtual address contained in the virtual address response message is set as the address of the non-configured node in step 76.

An address indicates an IP address in an IPv6 environment. A duplicate address indicates an address of a node receiving the duplicate address search message or an address of the non-configured node when the address of the non-configured node is the same as that of the node. A virtual address indicates an address in which a virtual interface ID is added to the duplicate address.

The duplicate address search message contains a source address set to a non-configured address, a destination address set to a multicast address for all nodes included in the subnet, and a target address set to a tentative address of the non-configured node. The duplicate address response message contains a source address set to the address of the configured node receiving the duplicate address search message, a destination address set to the multicast address for all nodes included in the subnet, and a target address set to the address of the configured node receiving the duplicate address search message. The virtual address allocation message contains a source address set to a tentative address composed of a virtual address allocation request prefix and an interface ID and a destination address set to a multicast address for all routers included in the subnet, and carries a duplicate address search flag set to be ON as additional information. The virtual address response message contains a source address set to the address of the arbitrary router receiving the virtual address allocation message and a destination address set to the tentative address composed of the virtual address allocation request prefix and the interface ID, carries a duplicate address search flag set to be ON as additional information, and provides an additional virtual interface ID.

Figure 8:
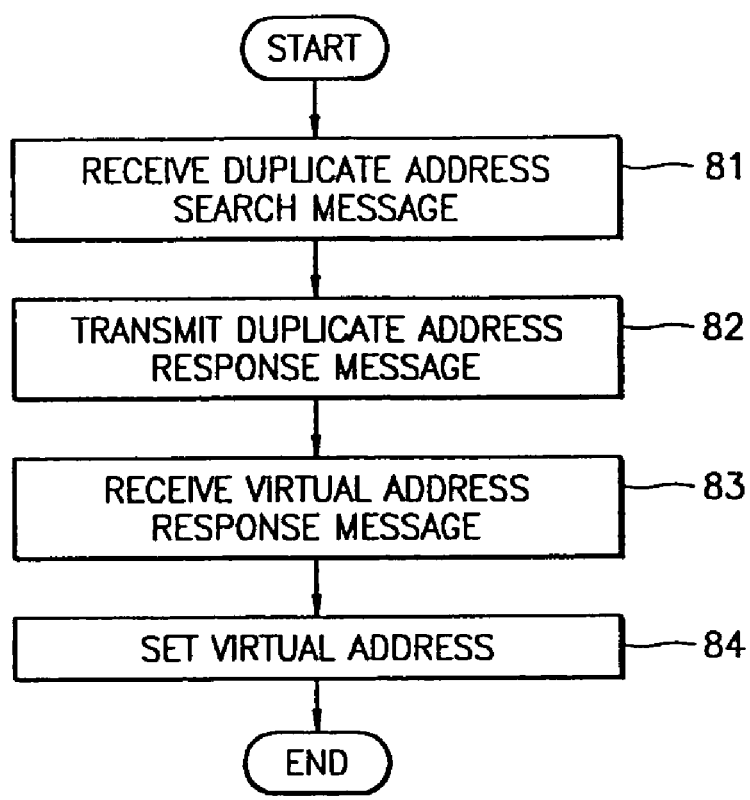
FIG. 8 is a flowchart of a method of a configured node automatically allocating virtual addresses to nodes having the same address, according to another embodiment of the present invention.

FIG. 8 is a flowchart of a method of a configured node automatically allocating virtual addresses to nodes having the same address, according to another embodiment of the present invention. A duplicate address search message is received from an arbitrary node included in a subnet including the configured node in step 81. Next, a duplicate address response message is generated and transmitted to the arbitrary node in step 82. Next, a virtual address response message responding to a virtual address allocation message generated in response to the duplicate address response message is received from an arbitrary router included in the subnet in step 83. Then, a virtual address included in the allocation address response message is set as the address of the configured node in step 84.

An address indicates an IP address in an IPv6 environment. A duplicate address indicates an address of the configured node when an address contained in the duplicate address search message is the same as the address of the configured node. A virtual address indicates an address in which a virtual interface ID is added to the duplicate address.

The duplicate address search message contains a source address set to a non-configured address, a destination address set to a multicast address for all nodes included in the subnet, and a target address set to a tentative address of the arbitrary node transmitting the duplicate address search message. The duplicate address response message contains a source address set to the address of the arbitrary node receiving the duplicate address search message, a destination address set to the multicast address for all nodes included in the subnet, and a target address set to the address of the arbitrary node receiving the duplicate address search message. The virtual address response message contains a source address set to the address of the arbitrary router and a destination address set to the address of the configured node, carries a duplicate address search flag set to be ON as additional information, and provides an additional virtual interface ID.

Figure 9:
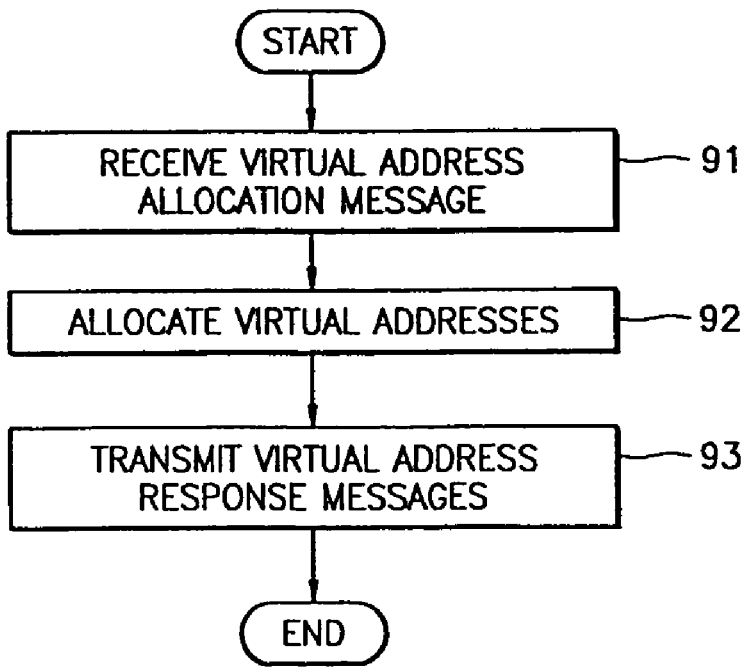
FIG. 9 is a flowchart of a method of a router automatically allocating virtual addresses to nodes having the same address, according to still another embodiment of the present invention.

FIG. 9 is a flowchart of a method of a router automatically allocating virtual addresses to nodes having the same address, according to still another embodiment of the present invention. A virtual address allocation message is received from an arbitrary node included in a subnet including the router in step 91. Next, virtual addresses are allocated to the arbitrary node and another node, which have the same address indicated as a duplicate address contained in the virtual address allocation message, in step 92. Next, virtual address response messages respectively containing the virtual addresses are generated and transmitted to the nodes, respectively, in step 93.

An address indicates an IP address in an IPv6 environment. A duplicate address indicates an address of a configured node or an address of the arbitrary node when the address of the arbitrary node included in the subnet is the same as the address of the configured node. A virtual address indicates an address in which a virtual interface ID is added to the duplicate address.

The virtual address allocation message contains a source address set to a tentative address composed of a virtual address allocation request prefix and an interface ID and a destination address set to a multicast address for all routers included in the subnet, and carries a duplicate address search flag set to be ON as additional information. A first virtual address response message contains a source address set to the address of the router receiving the virtual address allocation message and a destination address set to the address of the configured node, carries a duplicate address search flag set to be ON as additional information, and provides an additional virtual interface ID. A second virtual address response message contains a source address set to the address of the router receiving the virtual address allocation message and a destination address set to a tentative address composed of a virtual address allocation request prefix and an interface ID, carries a duplicate address search flag set to be ON as additional information, and provides an additional virtual interface ID.

Figure 10:
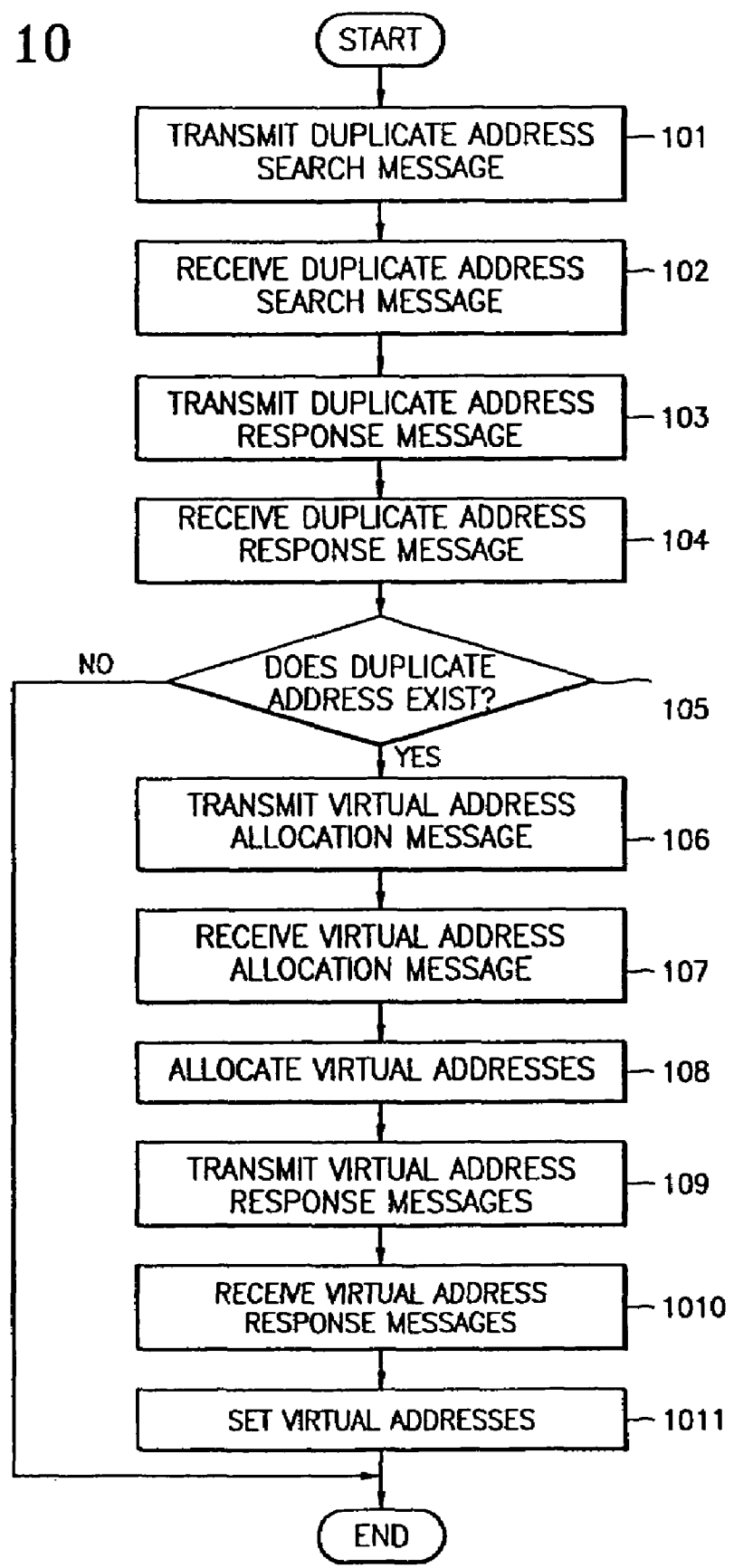
FIG. 10 is a flowchart of a method of automatically allocating virtual addresses to nodes having the same address, according to still another embodiment of the present invention.

FIG. 10 is a flowchart of a method of automatically allocating virtual addresses to nodes having the same address, according to still another embodiment of the present invention. A duplicate address search message is generated and transmitted to an arbitrary node included in a subnet including a non-configured node in step 101. Next, the arbitrary node receives the duplicate address search message in step 102 and generates and transmits a duplicate address response message to the non-configured node in response to the duplicate address search message in step 103. Next, the non-configured node receives the duplicate address response message in step 104. Subsequently, when the duplicate address response message indicates that there is a duplicate address in step 105, the non-configured node generates and transmits a virtual address allocation message to an arbitrary router included in the subnet in step 106. However, when the duplicate address response message indicates that a duplicate address does not exist in step 105, the operation ends because a virtual address is not necessary. Thereafter, the arbitrary router receives the virtual address allocation message in step 107, allocates virtual addresses to the arbitrary node and the non-configured node, which have the same address, namely, the duplicate address contained in the virtual address allocation message, in step 108, and transmits virtual address response messages respectively containing the virtual addresses to each of the non-configured node and the arbitrary configured node in step 109. Next, the non-configured node and the arbitrary configured node receive the virtual address response messages, respectively, in step 1010. Subsequently, the non-configured node and the arbitrary configured node set the virtual addresses contained in the virtual address response messages as their addresses in step 1011.

An address indicates an IP address in an IPv6 environment. A duplicate address indicates an address of the configured node or an address of the non-configured node when the address of the non-configured node is the same as that of the configured node receiving the duplicate address search message. A virtual address indicates an address in which a virtual interface ID is added to the duplicate address.

The duplicate address search message contains a source address set to a non-configured address, a destination address set to a multicast address for all nodes included in the subnet, and a target address set to a tentative address of the non-configured node. The duplicate address response message contains a source address set to the address of the configured node receiving the duplicate address search message, a destination address set to the multicast address for all nodes included in the subnet, and a target address set to the address of the configured node receiving the duplicate address search message. The virtual address allocation message contains a source address set to a tentative address composed of a virtual address allocation request prefix and an interface ID and a destination address set to a multicast address for all routers included in the subnet, and carries a duplicate address search flag set to be ON as additional information. A first virtual address response message contains as a source address set to the address of the router and a destination address set to the address of the configured node, carries a duplicate address search flag set to be ON as additional information, and provides an additional virtual interface ID. A second virtual address response message contains a source address set to the address of the router 63 receiving the virtual address allocation message and a destination address set to a tentative address composed of a virtual address allocation request prefix and an interface ID, carries a duplicate address search flag set to be ON as additional information, and provides an additional virtual interface ID.

Figure 11:
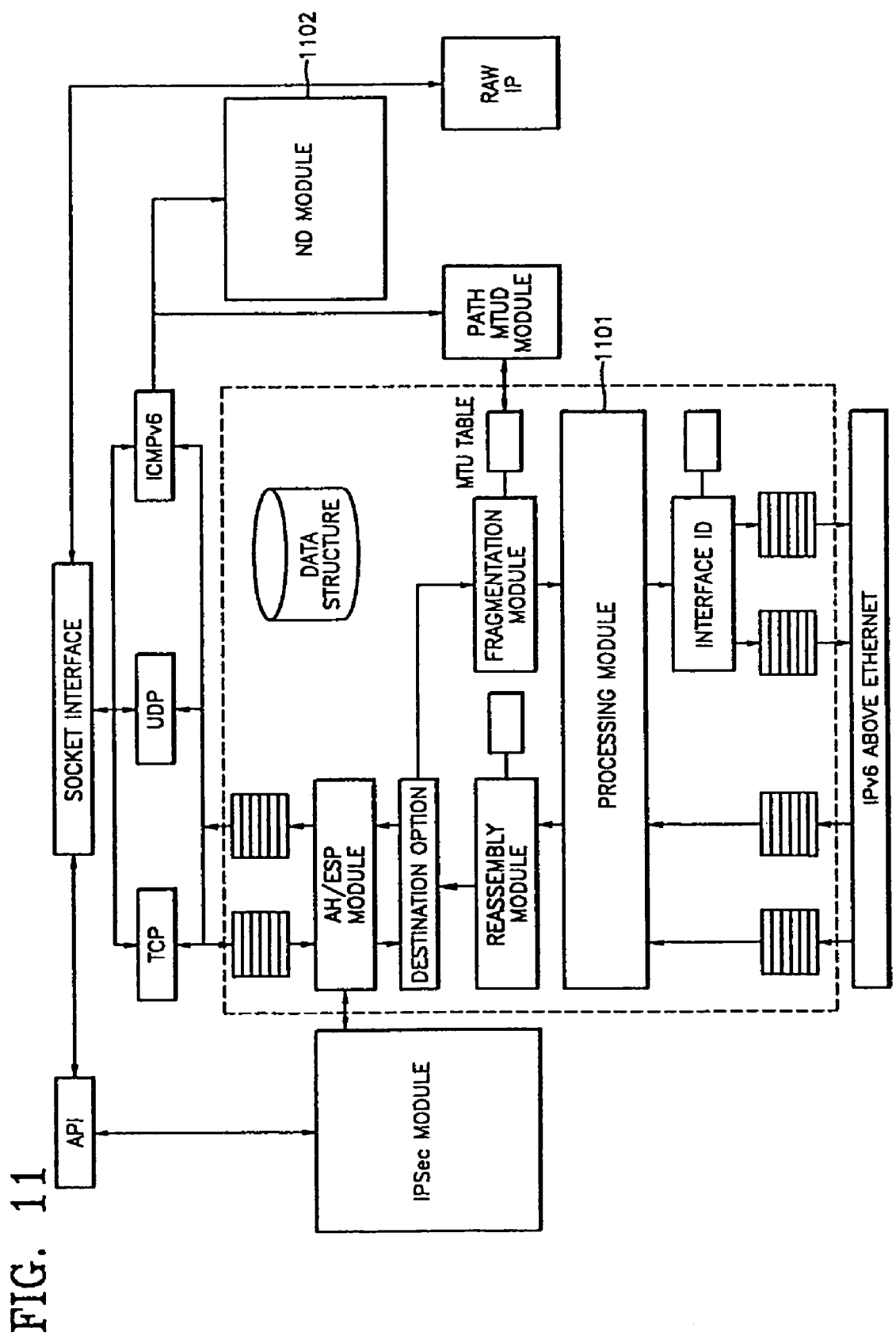
FIG. 11 is a diagram of the structure of a protocol stack, which automatically allocates virtual addresses to nodes having the same address.

FIG. 11 is a diagram of the structure of a protocol stack for automatically allocating virtual addresses to nodes having the same address. The protocol stack includes a lower layer including a physical layer and a data link layer, an IP layer transmitting a data packet using a combination of an IPv6 address and an additional virtual interface ID as a new IPv6 address, and an upper layer including a Transmission Control Protocol/User Datagram Protocol (TCP/UDP) layer and a socket layer. The lower layer, the IP layer, and the upper layer are sequentially stacked.

A protocol stack is generally composed of seven layers according to an Open System Interconnection (OSI) reference model. The first layer is a physical layer, which transmits a bit stream through a network having an electrical and mechanical system. The second layer is a data link layer, which controls errors and provides synchronization at a physical level. The third layer is a network layer, which controls a data path. The fourth layer is a transport layer, which controls transport of data from a source host to a destination host and manages errors. The fifth layer is a session layer, which configures conditions for transporting messages between a source host program and a destination host program. The sixth layer is a presentation layer converting a data, which is input to or output from one portion of an operating system, between different formats. The seventh layer is an application layer, which identifies communication partners, quality of service, and constraints on a data syntax, and considers user authentication and privacy.

The protocol stack shown in FIG. 11 has a modified third layer, i.e., the network layer, among the seven layers of the OSI reference model. Generally, transmitters and receivers are identified by IPv6 addresses, and IPv6 data packets are transmitted from the transmitter to the receivers. In this situation, when there is a duplicate IPv6 address, a real receiver or transmitter cannot be discriminated from a node having the duplicate IPv6 address. However, in the present invention, a new IPv6 address is generated by adding an additional virtual interface ID to a duplicate IPv6 address and used as the address of a receiver or transmitter so that the receiver or the transmitter can be discriminated from a node having a duplicate IPv6 address.

FIG. 11 shows in detail the IP layer, i.e., the third layer, of the protocol stack for automatically allocating virtual addresses to nodes having the same address. A processing module 1101 usually adds an IP address to a data packet, into which data is segmented by a fragmentation module. However, when there is a duplicate address, the processing module 1101 adds an additional virtual interface ID to the data packet in addition to the IP address. An ND module 1102 usually transports various messages among nodes. However, when there is a duplicate address, the ND module 1102 transports an RS message having a virtual address allocation request prefix in addition to the existing various messages.

The present invention can be realized as a program, which can be executed in a computer and can be implemented in a universal digital computer executing the program using a computer readable recording medium. In addition, the data structure used in the above embodiments of the present invention can be recorded in a computer readable recording medium using various means. The computer readable recording medium may be a magnetic storage medium (for example, a ROM, a floppy disc, or a hard disc), an optical readable medium (for example, a CD-ROM or DVD), or carrier waves (for example, transmitted through Internet).

According to the present invention, even if two nodes in one subnet have the same address, new virtual addresses using a virtual address allocation request prefix newly defined by an ND message and an additional virtual interface ID can be allocated to the two nodes, respectively. Accordingly, addresses can be automatically set without management overseen by a network operator. Furthermore, an existing address space can be extended by allocating a plurality of virtual addresses to a duplicate address.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of a non-configured node automatically allocating virtual addresses to nodes having the same address, the method comprising:

generating and transmitting a duplicate address search message to an arbitrary node included in a subnet including the non-configured node;

receiving a duplicate address response message responding to the duplicate address search message from the arbitrary node receiving the duplicate address search message;

generating and transmitting a virtual address allocation message to an arbitrary router included in the subnet when the duplicate address response message indicates that there is a duplicate address; and receiving a virtual address response message responding to the virtual address allocation message from the arbitrary router receiving the virtual address allocation message.

2. The method of claim 1, further comprising setting a virtual address included in the virtual address response message as an address of the non-configured node.

3. The method of claim 1, wherein the address is an Internet Protocol version 6 (IPv6) address.

4. The method of claim 1, wherein the duplicate address is the address of the non-configured node or the arbitrary node receiving the duplicate address search message when the address of the non-configured node is the same as that of the arbitrary node.

5. The method of claim 1, wherein the virtual address is an address in which a virtual interface identification (ID) is added to the duplicate address.

6. The method of claim 1, wherein the duplicate address search message contains a source address set to a non-configured address, a destination address set to a multicast address for all nodes included in the subnet, and a target address set to a tentative address of the non-configured node.

7. The method of claim 1, wherein the duplicate address response message contains a source address set to the address of the arbitrary node receiving the duplicate address search message, a destination address set to a multicast address for all nodes included in the subnet, and a target address set to an address of the arbitrary node receiving the duplicate address search message.

8. The method of claim 1, wherein the virtual address allocation message contains a source address set to a tentative address composed of a virtual address allocation request prefix and an interface ID and a destination address set to a multicast address for all routers included in the subnet, and carries a duplicate address search flag set to be ON as additional information.

9. The method of claim 1, wherein the virtual address response message contains a source address set to an address of the arbitrary router receiving the virtual address allocation message and a destination address set to a tentative address composed of a virtual address allocation request prefix and an interface ID, carries a duplicate address search flag set to be ON as additional information, and provides an additional virtual interface ID.

10. A method of a configured node automatically allocating virtual addresses to nodes having the same address, the method comprising:
receiving a duplicate address search message from an arbitrary node included in a subnet including the configured node;
generating and transmitting a duplicate address response message responding to the duplicate address search message to the arbitrary node included in the subnet; and
receiving a virtual address response message responding to a virtual address allocation message corresponding to the duplicate address response message indicating that there is a duplicate address from an arbitrary router included in the subnet.

11. The method of claim 10, further comprising setting a virtual address included in the virtual address response message as an address of the configured node.

12. The method of claim 10, wherein the address is an Internet Protocol version 6 (IPv6) address.

13. The method of claim 10, wherein the duplicate address is an address of the configured node or the arbitrary node when an address contained in the duplicate address search message is the same as the address of the configured node.

14. The method of claim 10, wherein the virtual address is an address in which a virtual interface ID is added to the duplicate address.

15. The method of claim 10, wherein the duplicate address search message contains a source address set to a non-configured address, a destination address set to a multicast address for all nodes included in the subnet, and a target address set to a tentative address of the arbitrary node transmitting the duplicate address search message.

16. The method of claim 10, wherein the duplicate address response message contains a source address set to an address of the configured node receiving the duplicate address search message, a destination address set to the multicast address for all nodes included in the subnet, and a target address set to the address of the configured node receiving the duplicate address search message.

17. The method of claim 10, wherein the virtual address response message contains a source address set to the address of the arbitrary router and a destination address set to an address of the configured node, carries a duplicate address search flag set to be ON as additional information, and provides an additional virtual interface ID.

18. A method of a router automatically allocating virtual addresses to nodes having the same address, the method comprising:
receiving a virtual address allocation message from an arbitrary node included in a subnet including the router;
allocating virtual addresses to a duplicate address included in the virtual address allocation message; and
generating and transmitting a virtual address response message responding to the virtual address allocation message to the arbitrary node within the subnet.

19. The method of claim 18, wherein the address is an Internet Protocol version 6 (IPv6) address.

20. The method of claim 18, wherein the duplicate address is an address of the arbitrary node or the configured node when the address of the arbitrary node is the same as the address of the configured node.

21. The method of claim 18, wherein the virtual address is an address in which a virtual interface ID is added to the duplicate address.

22. The method of claim 18, wherein the virtual address allocation message contains a source address set to a tentative address composed of a virtual address allocation request prefix and an interface ID and a destination address set to a multicast address for all routers included in the subnet, and carries a duplicate address search flag set to be ON as additional information.

23. The method of claim 18, wherein the virtual address response message contains a source address set to an address of the router and a destination address set to an address of the configured node, carries a duplicate address search flag set to be ON as additional information, and provides an additional virtual interface ID.

24. The method of claim 18, wherein the virtual address response message contains a source address set to an address of the router receiving the virtual address allocation message and a destination address set to a tentative address composed of a virtual address allocation request prefix and an interface ID, carries a duplicate address search flag set to be ON as additional information, and provides an additional virtual interface ID.

* * * * *